US012807082B2

(12) United States Patent
Yanagida

(10) Patent No.: US 12,807,082 B2
(45) Date of Patent: Nov. 24, 2026

(54) ASSEMBLY FOR REAR SIDE OF VEHICLE

(71) Applicant: TOYOTA JIDOSHA KABUSHIKI KAISHA, Toyota (JP)

(72) Inventor: Ryo Yanagida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 18/420,977

(22) Filed: Jan. 24, 2024

(65) Prior Publication Data

US 2024/0343209 A1 Oct. 17, 2024

(30) Foreign Application Priority Data

Apr. 17, 2023 (JP) ................................ 2023-067447

(51) Int. Cl.
*B60R 13/08* (2006.01)
*B60R 11/02* (2006.01)
*B60R 13/02* (2006.01)

(52) U.S. Cl.
CPC ...... *B60R 13/0884* (2013.01); *B60R 11/0217* (2013.01); *B60R 13/0243* (2013.01)

(58) Field of Classification Search
None
See application file for complete search history.

(56) References Cited

U.S. PATENT DOCUMENTS 9,326,053 B2 * 4/2016 Nedelman ........... B60R 13/0243
11,760,273 B2 * 9/2023 Hamme ................... H04R 1/02 381/86
2019/0359130 A1 11/2019 Fujii et al.
2022/0379819 A1 12/2022 Hamme et al.

FOREIGN PATENT DOCUMENTS

JP 2003-348678 A 12/2003
JP 2006-021718 A 1/2006
JP 2019-202653 A 11/2019

OTHER PUBLICATIONS

OpenStax_ Resonance; Paul Peter Urone, Physics, Mar. 26, 2020, OpenStax, https://openstax.org/books/physics/pages/14-4-sound-interference-and-resonance.*

* cited by examiner

*Primary Examiner* — Aaron L Lembo
(74) *Attorney, Agent, or Firm* — SoraIP, Inc.

(57) ABSTRACT

The assembly consists of a back door including an inner panel, a subwoofer attached to the inner panel, and two or more braces which are provided in the inner panel and which reduce the primary vibration mode and the secondary vibration mode of the inner panel which is vibrated by the subwoofer.

17 Claims, 5 Drawing Sheets

BELLY POSITION OF
THE SECONDARY RESONANCE

ASSEMBLY FOR REAR SIDE OF VEHICLE

CROSS-REFERENCE TO RELATED APPLICATION

This application claims priority to Japanese Patent Application No. 2023-067447 filed on Apr. 17, 2023 incorporated herein by reference in its entirety.

BACKGROUND

1. Technical Field

The present disclosure relates to an assembly.

2. Description of Related Art

Hitherto, a technology for providing a speaker on a back door of a vehicle is disclosed as described in Japanese Unexamined Patent Application Publication No. 2019-202653 (JP 2019-202653 A). As a technology for reproducing bass, it is conceivable to mount a subwoofer on the back door.

SUMMARY

An inner panel of the back door may vibrate due to operation of the subwoofer. Sound pressure or sound quality of sound output may decrease due to the vibration. Further, chattering noise unpleasant for occupants may occur due to the vibration.

In view of such circumstances, an object of the present disclosure is to provide an assembly in which vibration of an inner panel of a back door due to operation of a subwoofer is reduced.

An assembly according to an embodiment of the present disclosure includes:

a back door including an inner panel;

a subwoofer attached to the inner panel; and two or more braces provided on the inner panel and configured to reduce a primary vibration mode and a secondary vibration mode of the inner panel that is vibrated by the subwoofer.

According to the embodiment of the present disclosure, the vibration of the inner panel of the back door due to the operation of the subwoofer can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline of Embodiment

Figure 1:
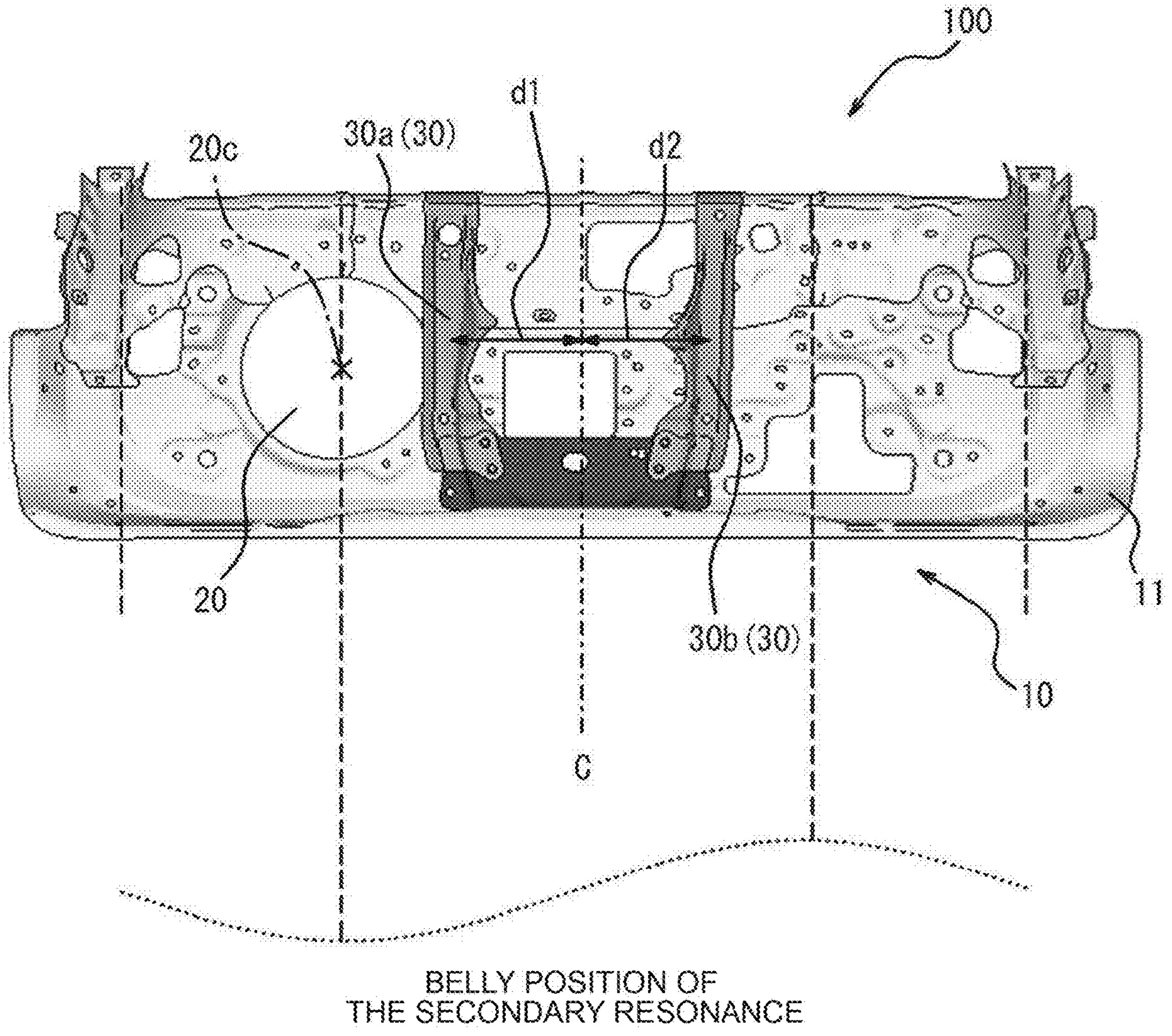
FIG. 1 is a view of an inner panel of an assembly according to an embodiment of the present disclosure as viewed from an inner surface.
Figure 2:
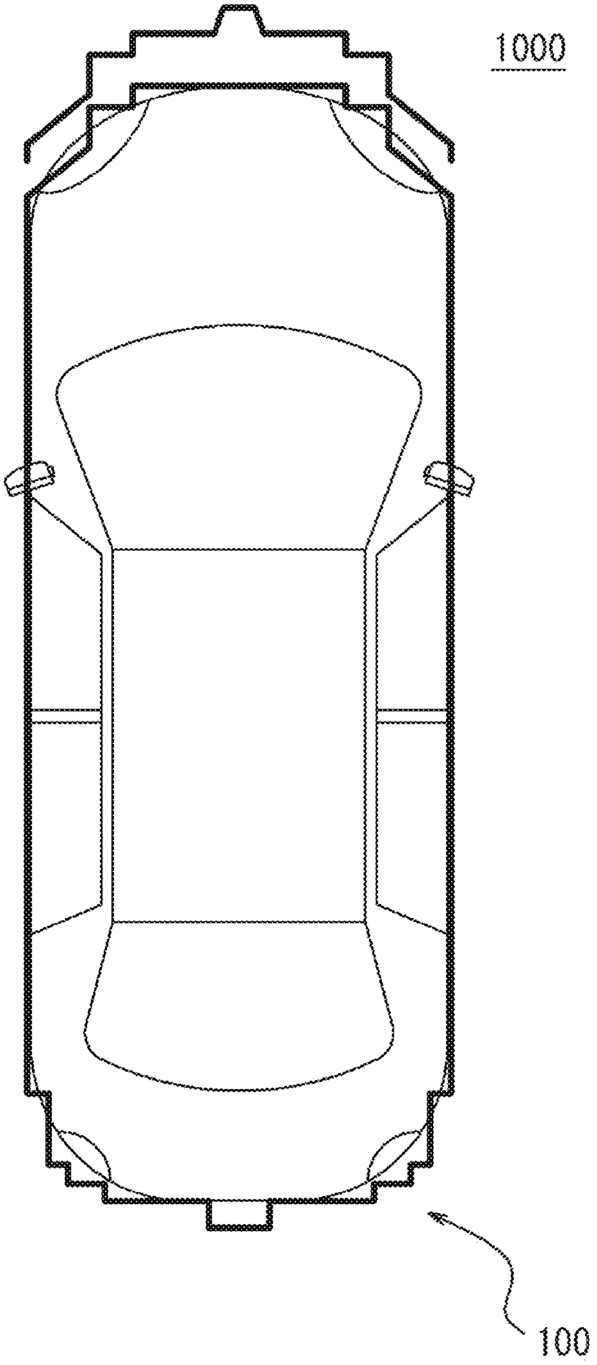
FIG. 2 is a plan view illustrating a vehicle including an assembly according to an embodiment of the present disclosure.

With reference to FIG. 1, an overview of an assembly 100 according to an embodiment of the present disclosure will be described. As shown in FIG. 2, the assembly 100 is included, for example, on the rear side of the vehicle 1000.

The vehicle 1000 is, for example, an automobile, but is not limited thereto, and may be any vehicle. Motor vehicles include, but are not limited to, for example, gasoline-powered vehicles, diesel-powered vehicles, Battery Electric Vehicle (BEV), Hybrid Electric Vehicle (HEV), Plug-in Hybrid Electric Vehicle (PHEV), or Fuel Cell Electric Vehicle (FCEV).

First, the outline of the present embodiment will be described, and the details will be described later. As shown in FIG. 1, the assembly 100 includes a back door 10 including an inner panel 11. The assembly 100 further comprises a subwoofer 20. The subwoofer 20 is attached to the inner panel 11. The assembly 100 further comprises two or more braces 30. The brace 30 is provided on the inner panel 11, and reduces the primary vibration mode and the secondary vibration mode of the inner panel 11 vibrating by the subwoofer 20.

According to the present embodiment, by providing the brace 30 in the inner panel 11, the rigidity in the vicinity of the brace 30 can be improved. This may increase the natural frequency of the inner panel 11. As a result, the primary vibration mode and the secondary vibration mode of the inner panel 11 vibrating by the subwoofer 20 are reduced.

Further, the inventors noticed that there is a plurality of antinodes (positions where the amplitude is maximized) of the primary vibration mode of the inner panel 11 during the operation of the subwoofer 20. By providing the inner panel 11 with two or more braces 30, the rigidity of a plurality of portions of the inner panel 11 can be improved. As a result, the primary vibration mode and the secondary vibration mode can be more effectively reduced in most of the inner panel 11.

(Configuration of Assembly)

The assembly 100 includes a back door 10, a subwoofer 20, and two or more braces 30. The assembly 100 may further comprise a connecting member 31 shown in FIG. 3.

The back door 10 may be a bounce-up type. More specifically, the back door 10 may be opened and closed by pivoting about the rear upper edge of the vehicle 1000 shown in FIG. 2. When the back door 10 is opened, the rear side of the vehicle 1000 is opened.

Figure 3:
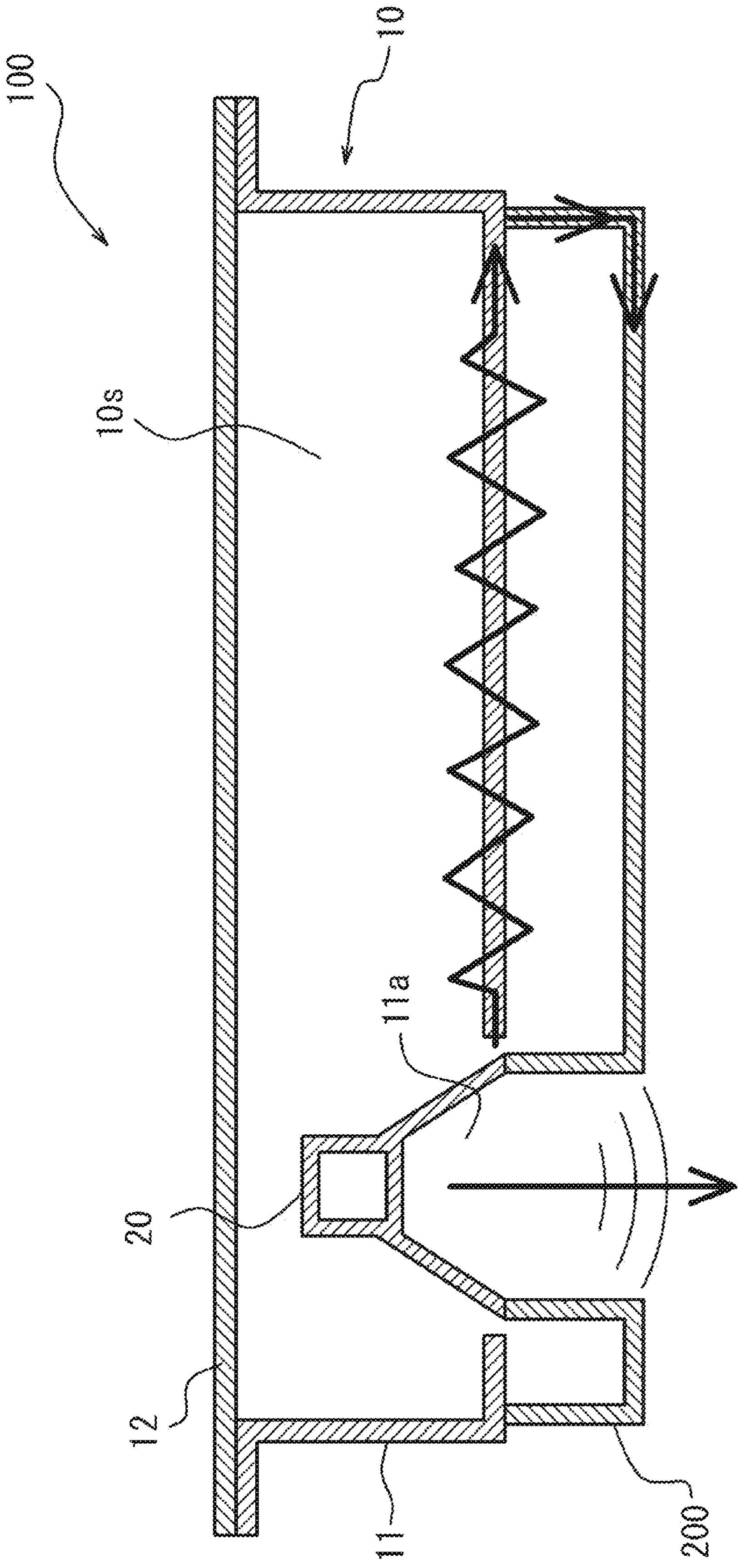
FIG. 3 is a horizontal cross-sectional view of the assembly of FIG. 1.

FIG. 3 is a horizontal cross-sectional view of the assembly 100 of FIG. 1. As illustrated in FIG. 3, the back door 10 includes an inner panel 11 and an outer panel 12. The back door glass may be fitted into the upper half of the back door 10.

The inner panel 11 is disposed inside the vehicle 1000. A trim 200 is attached to a surface of the inner panel 11 on the vehicle cabin side. Each of the inner panel 11 and the trim 200 may have an opening for exposing a speaker of the subwoofer 20, which will be described later, to the inside of the vehicle (the opening of the inner panel is indicated by 11*a*). The inner panel 11 may be formed of a steel plate, a resin plate, or the like. The trim 200 may be formed from a resin plate, leather, fabric, or the like.

The inner panel 11 and the outer panel 12 define an interior space 10*s*. The inner panel 11 and the outer panel 12 may be joined by an adhesive, welding, or the like.

An opening may exist between the inner panel 11 and the outer panel 12. When the opening is present, the "internal space" in the present embodiment communicates with the vehicle cabin space via the opening. The interior space 10*s* may be disposed in the lower half of the back door 10.

The subwoofer 20 reproduces bass in a band lower than that of the main speaker. The subwoofer 20 is attached to the back door 10, and has a front face facing the outside (vehicle inside) of the back door 10 and a back face facing the inside space 10*s* (vehicle outside) of the back door 10. The subwoofer 20 may be attached to, for example, a vehicle outside of the inner panel 11.

As shown in FIG. 1, two or more braces 30 (two in FIG. 1) are provided on the rear side of the inner panel 11. One brace 30 may be provided on each of both sides of the center C in the width direction of the inner panel 11. The brace 30*a* on one side of the center C in the width direction and the brace 30*b* on the other side of the center C in the width direction may be arranged symmetrically with respect to the center C in the width direction. The brace 30*a*, 30*b* may extend along the vertical H. The upper end portion of the brace 30*a*, 30*b* may be located near the upper end portion of the inner panel 11. In other embodiments, the upper end of the brace may not extend to the upper end of the inner panel 11. The lower end of the brace 30*a*, 30*b* terminates above the lower end of the inner panel 11.

Figure 4:
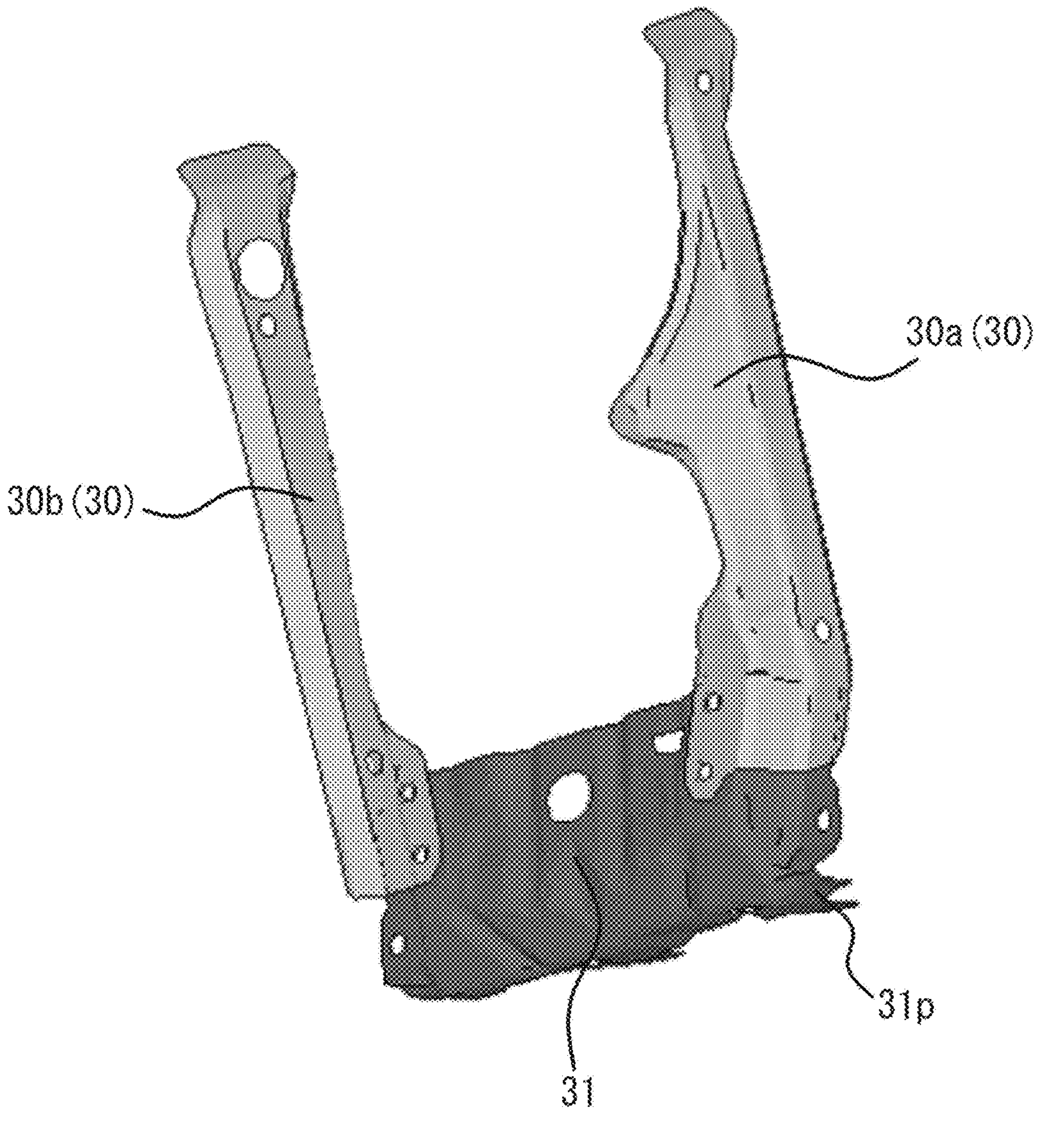
FIG. 4 is a perspective view showing two braces of the assembly of FIG. 1 and a coupling member connecting the braces.

The brace 30*a*, 30*b* extends in the widthwise direction of the inner panel 11 and in the out-of-plane direction (rear direction) of the inner panel 11. The inner panel 11 and the outer panel 12 may be fixed via brace 30*a*, 30*b*. More specifically, the connecting member 31 that connects the brace 30*a* and the brace 30*b* may be fixed to the outer panel 12. As shown in FIG. 4, a protruding portion 31*p* extending toward the outer panel 12 may be formed at a lower end portion of the connecting member 31. The protruding portion 31*p* and the side surface of the connecting member 31 may be fixed to the outer panel 12 while covering the outer panel 12.

As shown in FIG. 3, vibration caused by the operation of the subwoofer 20 may be amplified in a natural vibration mode (mainly a primary vibration mode and a secondary vibration mode) in the back door 10 or the trim 200. Due to the amplified vibration, the back door 10 or the trim 200 may generate a vibratory sound.

The brace 30*a*, 30*b* reduces the primary vibration mode and the secondary vibration mode of the inner panel 11 which vibrate by the subwoofer 20. By providing the brace 30*a*, 30*b* in the inner panel 11, the stiffness in the vicinity of the brace 30*a*, 30*b* can be improved. This may increase the natural frequency of the inner panel 11. As a result, the primary vibration mode and the secondary vibration mode of the inner panel 11 vibrating by the subwoofer 20 are reduced. Third-order or higher vibration modes of the inner panel 11 may also be reduced. The vibration propagated from the inner panel 11 to the trim 200 is also reduced.

The distance from the center of the inner panel 11 to the brace 30*a*, 30*b* may be ¼ times the wavelength of the first-order oscillation of the inner panel 11. More specifically, as shown in FIG. 1, when the inner panel 11 is viewed from the inner surface, the distance d1, d2 from the width direction center C of the inner panel 11 to the width direction center of the contacting area between the brace 30*a*, 30*b* and the inner panel 11 may be ¼ times the wavelength of the first-order oscillation of the inner panel 11. With this configuration, the rigidity around the belly of the secondary resonance of the inner panel 11 is improved. Therefore, the primary vibration mode and the secondary vibration mode of the inner panel 11 can be more effectively reduced. More generally, the distance from the center of the subwoofer 20 to the widthwise center of the contact area between the brace 30*a*, 30*b* and the inner panel 11 may be (2n+1)/4 times the wavelength of the primary oscillation of the inner panel 11 (n is an integer of 0 or more). With this configuration, the rigidity around the antinode of the secondary resonance of the inner panel 11 can be improved.

Figure 5:
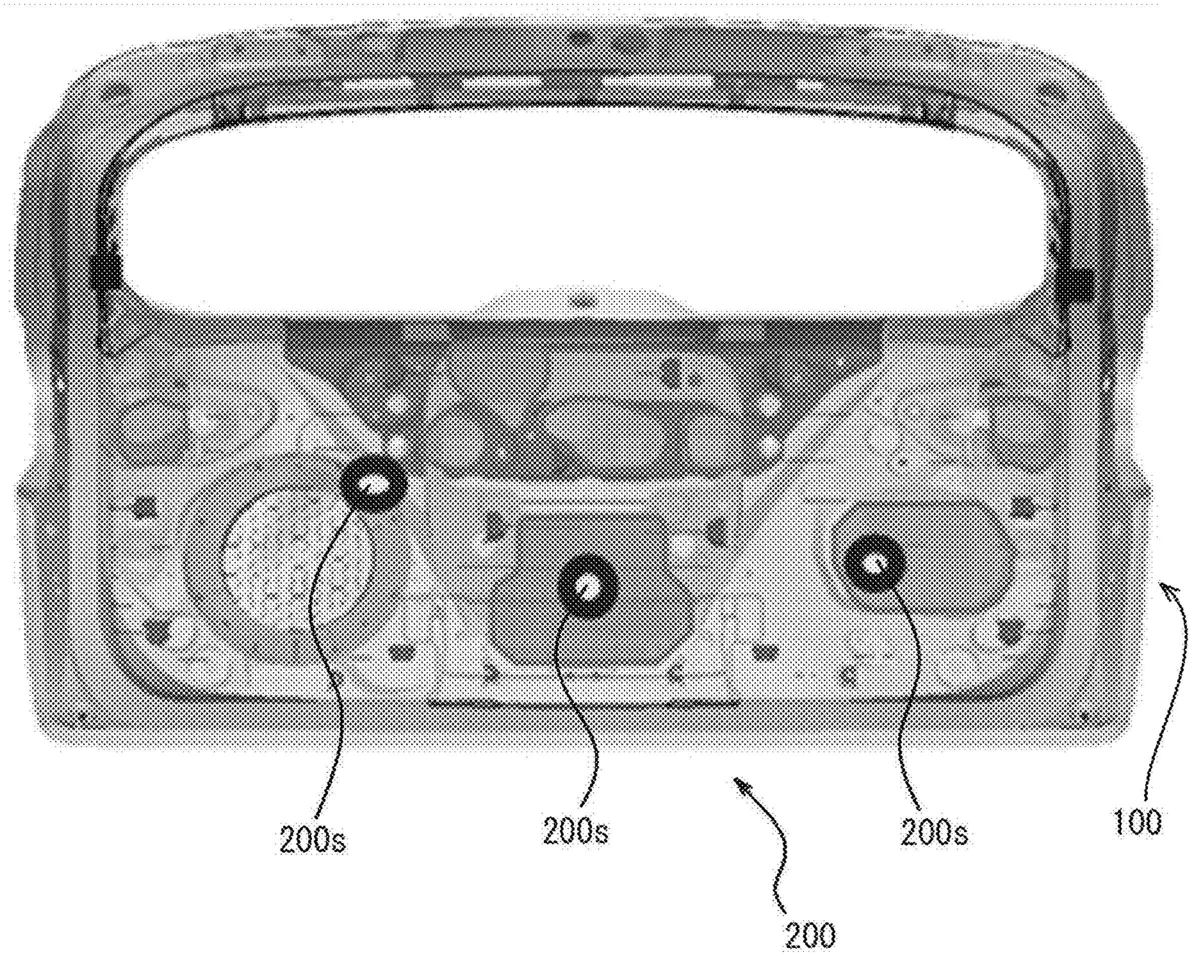
FIG. 5 is a view illustrating an assembly and a trim in a vehicle in a state where the trim is translucent.

FIG. 5 illustrates the assembly 100 and the trim 200 of the vehicle 1000 with the trim 200 translucent. At the resonance point 200*s* (the position surrounded by the three circles) of the trim 200 shown in FIG. 5, the oscillation caused by the operation of the subwoofer 20 is amplified. In the present embodiment, the inner panel 11 is connectable to the vicinity of the resonance point 200*s* of the trim 200. The inner panel 11 may be connected to the vicinity of the resonance point of the trim 200 by a clip or the like. When the vicinity of the resonance point 200*s* of the trim 200 is connected to the inner panel 11, the stiffness in the vicinity of the resonance point 200*s* can be improved. Thus, the oscillation of the resonance point 200*s* by the subwoofer 20 can be suppressed. Note that the resonance point 200*s* of the trim 200 may be specified by pre-measurement.

The area of the inner panel 11 where the vibration is suppressed may be connectable to the vicinity of the resonance point 200*s* of the trim 200. In a region of the inner panel 11 having high rigidity, vibration is suppressed. Therefore, the vicinity of the brace 30*a*, 30*b* is included in an area where the oscillation is suppressed.

As described above, the assembly 100 according to the present embodiment includes the back door 10 including the inner panel 11. The assembly 100 further comprises a subwoofer 20. The subwoofer 20 is attached to the inner panel 11. The assembly 100 further comprises two or more braces 30. The brace 30 is provided on the inner panel 11, and reduces the primary vibration mode and the secondary vibration mode of the inner panel 11 vibrating by the subwoofer 20.

According to this configuration, by providing the brace 30 in the inner panel 11, the rigidity in the vicinity of the brace 30 can be improved. This may increase the natural frequency of the inner panel 11. As a result, the primary vibration mode and the secondary vibration mode of the inner panel 11 vibrating by the subwoofer 20 are reduced.

Further, by providing two or more braces 30 in the inner panel 11, the rigidity of a plurality of portions of the inner panel 11 can be improved. As a result, the primary vibration mode and the secondary vibration mode can be effectively reduced in most of the inner panel 11.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

What is claimed is:

1. An assembly, comprising:

a back door including an inner panel, the inner panel primarily extending in a width direction of the back door and a height direction of the back door, the height direction being substantially perpendicular to the width direction;

a subwoofer attached to the inner panel on a side of a center reference line of the inner panel in the width direction of the back door, the center reference line extending in the height direction of the back door; and two or more braces provided on the inner panel, the two or more braces primarily extending in the height direction of the back door, wherein:

the two or more braces are configured to reduce a primary vibration mode and a secondary vibration mode of the inner panel that is vibrated by the subwoofer.

2. The assembly according to claim 1, wherein:

a first distance from the center reference line of the inner panel to a first brace of the two or more braces in the width direction is ¼ of a wavelength of the primary vibration mode of the inner panel; and a second distance from the center reference line of the inner panel to a second brace of the two or more braces in the width direction is ¼ of the wavelength of the primary vibration mode of the inner panel.

3. The assembly according to claim 1, wherein:

the back door further includes an outer panel; and the inner panel and the outer panel are fixed via the two or more braces.

4. The assembly according to claim 1, wherein the inner panel is connected to a resonance point of a trim of a vehicle.

5. The assembly according to claim 4, wherein the resonance point of the trim directly overlaps a first brace of the two or more braces in a depth direction of the back door, the depth direction being substantially perpendicular to the width direction and being substantially perpendicular to the height direction.

6. The assembly according to claim 1, wherein:

a first distance from the center reference line of the inner panel to a first brace of the two or more braces in the width direction is ¼ of a wavelength of the secondary vibration mode of the inner panel; and a second distance from the center reference line of the inner panel to a second brace of the two or more braces in the width direction is ¼ of the wavelength of the secondary vibration mode of the inner panel.

7. The assembly according to claim 1, wherein in a first brace of the two or more braces and a second brace of the two or more braces are positioned between a first antinode and a second antinode of the secondary vibration mode of the inner panel.

8. The assembly according to claim 1, wherein in a first brace of the two or more braces and a second brace of the two or more braces are positioned on opposite sides of a first antinode of the primary vibration mode of the inner panel.

9. The assembly according to claim 1, wherein in a first brace of the two or more braces and a second brace of the two or more braces are positioned on opposite sides of the center reference line of the inner panel in the width direction.

10. The assembly according to claim 1, wherein:

a first brace of the two or more braces has an inner facing surface facing the inner panel; and less than all of the inner facing surface of the first brace is directly affixed to the inner panel.

11. The assembly according to claim 1, wherein:

a first brace of the two or more braces has an end portion positioned at an end of the first brace in the height direction;

the end portion of the first brace is spaced apart from the inner panel; and the end portion of the first brace is not directly affixed to the inner panel.

12. An assembly, comprising:

a back door including an inner panel, the inner panel primarily extending in a width direction of the back door and a height direction of the back door, the height direction being substantially perpendicular to the width direction;

a subwoofer attached to the inner panel on a side of a center reference line of the inner panel in the width direction of the back door, the center reference line extending in the height direction of the back door;

a first brace connected to the inner panel, the first brace primarily extending in the height direction of the back door; and a second brace connected to the inner panel, the second brace primarily extending in the height direction of the back door, wherein:

the first brace and the second brace are positioned on a same side of the subwoofer in the width direction of the back door.

13. The assembly according to claim 12, wherein an entirety of the first brace and an entirety of the second brace are positioned on the same side of the subwoofer in the width direction of the back door.

14. The assembly according to claim 13, wherein:

the inner panel includes an aperture into which the subwoofer is fitted; and the first brace and the second brace extend beyond an entire perimeter of the aperture in the height direction of the back door.

15. The assembly according to claim 12, wherein the first brace and the second brace are positioned between a first antinode and a second antinode of a secondary vibration mode of the inner panel absent the first brace and the second brace.

16. The assembly according to claim 12, wherein the subwoofer is positioned at a first antinode of a secondary vibration mode of the inner panel absent the first brace and the second brace.

17. The assembly according to claim 12, wherein the first brace and the second brace are positioned on opposite sides of the center reference line of the inner panel.

* * * * *